Aug. 12, 1958 W. L. FLOEHR 2,846,957
LADING BAND ANCHOR
Filed June 24, 1954 2 Sheets-Sheet 1
FIG 1.
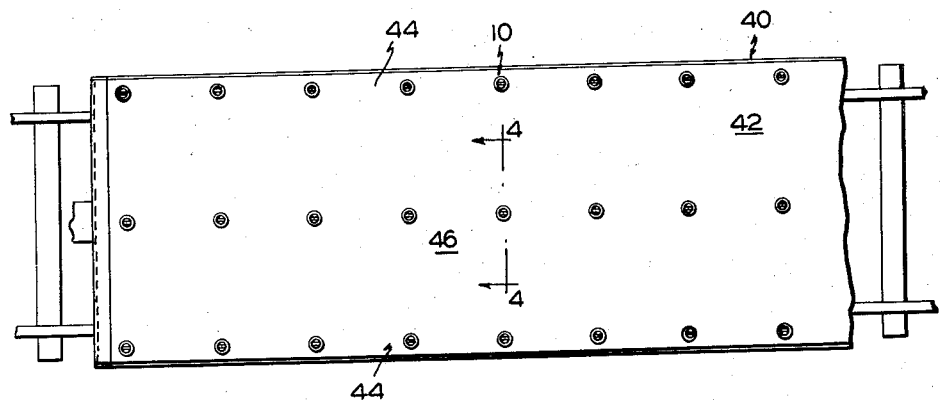
FIG 2.
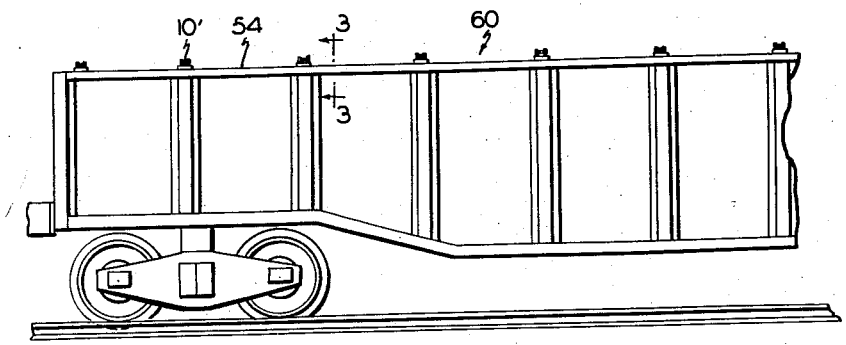
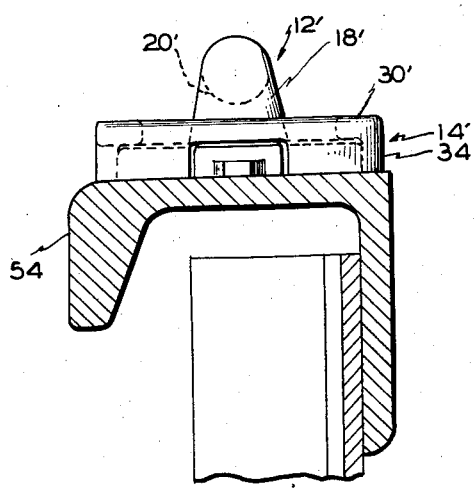
FIG 3.
INVENTOR
WALTER L. FLOEHR
BY Mead, Browne, Schuyler
& Beveridge
ATTORNEY

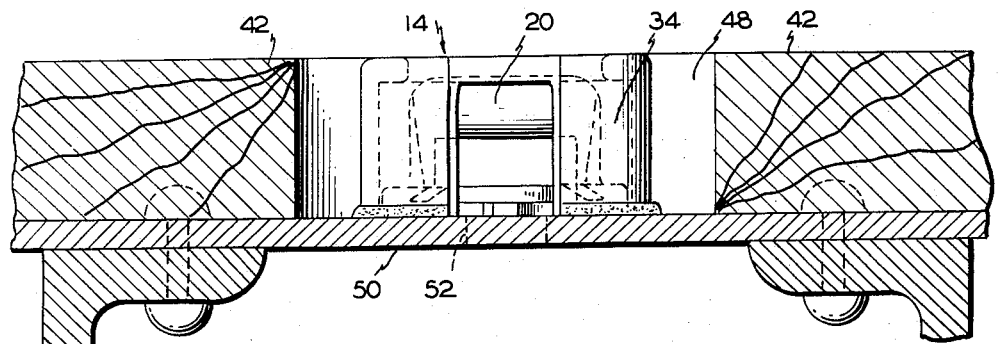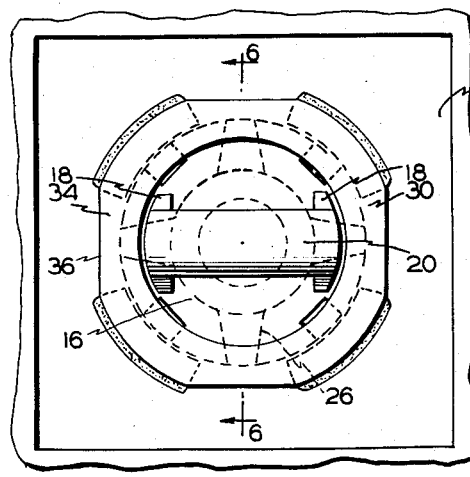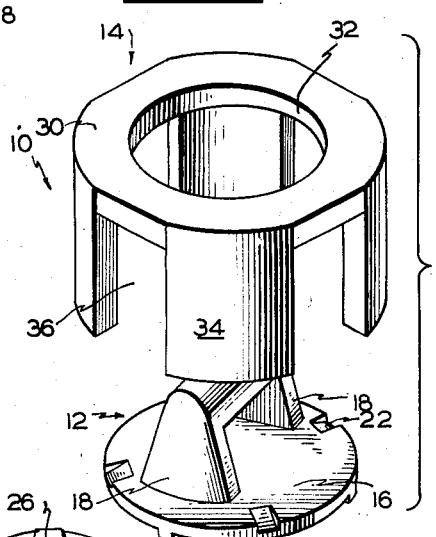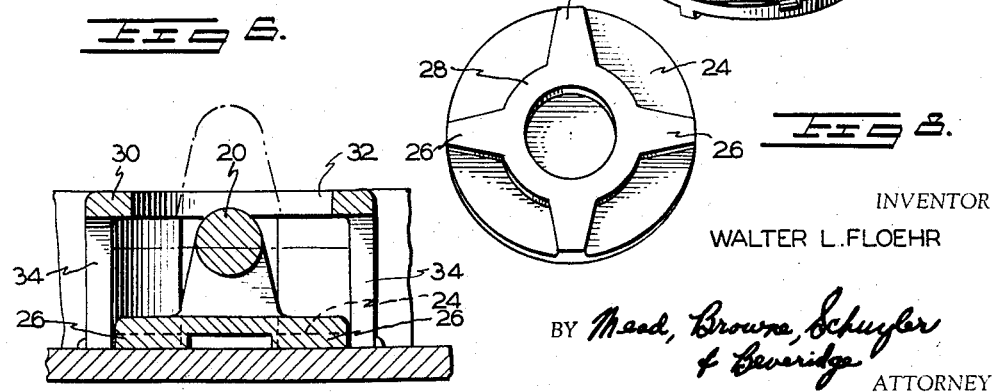

United States Patent Office 2,846,957
Patented Aug. 12, 1958

2,846,957

LADING BAND ANCHOR

Walter L. Floehr, Toledo, Ohio, assignor to Unitcast Corporation, a corporation of Ohio Application June 24, 1954, Serial No. 439,010

2 Claims. (Cl. 105—369)

This invention relates to lading anchors and more particularly to an angularly adjustable lading band anchor for use on railroad cars, particularly flat cars and gondola cars.

Most of the presently available lading band anchoring devices for use on freight cars permit little or no angular adjustment of the anchoring device to conform to various lading conditions. It would often be advantageous and simplify the banding operation if anchoring devices were angularly adjustable. However, the use of angularly adjustable lading band anchors is complicated by the fact that, because of the environment in which lading anchoring devices are located, these devices frequently collect foreign matter which tends to prevent proper angular movement of the anchoring device where the device is intended to have some degree of relative movement.

Accordingly, it is an object of this invention to provide a lading anchoring device which is angularly adjustable to conform to various lading conditions.

It is a further object of this invention to provide a lading band anchor which is angularly adjustable through a 360-degree angle about an axis perpendicular to the supporting surface for the anchor.

It is a still further object of the invention to provide a lading anchor which is self-cleaning and which ejects foreign matter and debris accumulated adjacent the rotatable element of the anchoring device.

It is another object of the invention to provide a lading anchor which is simple and inexpensive to manufacture and install and which is easily operable.

In achievement of these objectives, this invention provides a lading anchor comprising a disc-shaped member having an upstanding link portion engageable with the lading band. The disc member is surrounded by a generally cylindrical housing which is attached to a surface of the freight car. The disc member is freely rotatable within the housing through a 360-degree angle. In one embodiment of the invention, the disc member is also axially movable within the housing from a retracted position in which the upstanding link element is disposed entirely within the housing to an "in use" position in which the upstanding link portion projects axially beyond the housing. An important feature of the lading anchor construction is the provision of rib-like elements on the underneath surface and relieved portions on the upper surface of the rotatable disc member. Both the ribs and the relieved portions have a plowing action which serves to dislodge foreign matter and debris accumulated within the housing. This foreign matter is ejected through suitable openings provided in the peripheral surface of the housing portion.

Further objects and advantages of the invention will become apparent from the following description taken in connection with the accompanying drawings in which:

Fig. 1 is a plan view, partially cut away, of a railroad flat car showing the orientation of the lading anchors along the longitudinal center line and sides of the flat car;

Fig. 2 is a fragmentary side elevation of a gondola car showing the orientation of the lading anchors with respect to the car;

Fig. 3 is a view in section along line 3—3 of Fig. 2;

Fig. 4 is an enlarged sectional view along line 4—4 of Fig. 1 showing a lading anchor disposed along the longitudinal center axis of a flat car;

Fig. 5 is a top plan view of the lading anchor shown in Fig. 4;

Fig. 6 is a view in vertical section along line 6—6 of Fig. 5;

Fig. 7 is a perspective exploded view of the lading anchor shown in Figs. 1, 4, 5 and 6; while Fig. 8 is a bottom plan view of the disc-shaped anchor element showing the ribs which remove foreign matter and debris from the lading anchor housing.

Referring now to the drawings, the lading anchor in accordance with the invention is generally indicated at 10 and comprises a rotatable anchor element generally indicated at 12 and a housing member generally indicated at 14. The anchor element 12 is preferably a steel casing and includes a disc-shaped base portion 16. A pair of spaced bracket-like members 18 project from the upper surface of the base 16 and are connected to each other by a bar-like link member 20 which extends substantially parallel to the upper surface of the base portion 16 but in spaced relation thereto. The link 20 provides a member about which a lading band may be passed. The upper surface of the base portion 16 is provided with relieved portions 22 at spaced intervals around its periphery. As will be explained later the relieved portions 22 have a plowing action which aids in dislodging foreign matter in the path of the rotatable anchor element.

As will best be seen in Fig. 8, the anchor element 12 is provided with a plurality of radially extending rib members 26 which project below the bottom surface 24 of the base member 16. The ribs 26 radiate outwardly from a central annular hub portion 28 which lies beneath surface 24. The ribs 26 provide a plowing action which removes accumulated debris as the anchor element 12 is rotatably moved.

The rotatable anchor element 12 is received within the housing 14 as will best be seen in Figs. 4, 5 and 6. As will best be seen in Fig. 7, the housing member 14 is generally cylindrical in shape and includes at its upper end with respect to the view shown in the drawings an annular end portion 30 having a central opening 32. The outer wall of the housing 14 is defined by a plurality of axially extending web or leg portions 34 which are connected at their upper ends to the outer periphery of the end portion 30. The lower ends of the legs 34 are rigidly attached, as by welding, to a supporting surface of the freight car. The web portions 34 are in spaced relation to each other to define axially extending openings 36 at the outer periphery of the housing 14.

These openings 36 extend in an axial direction from the underneath surface of the annular end portion 30 to the supporting surface upon which the housing 14 is mounted. The diameter of the central opening 32 of the housing is slightly smaller than the outer diameter of the base portion 16 of the rotatable anchor element 12. Therefore, when the anchor element 12 is assembled in the housing 14 the outer peripheral edge of base portion 16 is positioned radially outwardly beyond the inner peripheral edge of the annular end portion 30. Thus, axial movement of the rotatable member 12 is limited by the end portion 30. However, the diameter of the central opening 32 is greater than the length of the link portion 20 so that the link 20 may pass through the opening 32 to the dotted outline position shown in Fig. 6 when the anchoring device is in use.

In the embodiment shown in Figs. 1, 4, 5, 6 and 7, the over-all height of the rotatable anchor element 12 including the rib portions 26, the base portion 16, the supporting brackets 18 and the link 20, is such that when the anchoring device is not in use the rotatable element 12 is disposed entirely within the housing 14 as shown in Figs. 4 and 6, the upper surface of link 20 lying below the plane of the upper surface of the annular end portion 30 of the housing 14. The outer diameter of the base portion 16 of the rotatable element 12 is slightly less than the inner diameter of the housing 14 at the inner surface of the web portions 34 of the housing, permitting free rotation of the element 12 within housing 14.

When anchoring devices of the type shown in Figs. 4, 5, 6 and 7 are used on a flat car, they may be arranged as shown in Fig. 1. The flat car generally indicated at 40 is provided with a floor 42. A plurality of the anchoring devices 10 are arranged in longitudinal rows adjacent the outside edges of the floor 42 as indicated at 44 and also along the center sill of the flat car as indicated at 46. A recess 48 is provided in the floor of the flat car for each of the respective anchoring devices 10. The details of the recess 48 provided in the floor of the flat car may best be seen in Fig. 4 which is a sectional view of one of the anchoring devices located on the center sill of the flat car along the longitudinal center line of the car. It will be seen that the upper surface of the housing portion 14 of the anchor device is substantially flush with the surface of the floor 42. The leg or web portions 34 of the housing are welded at their lower ends to the upper surface of the metal cover plate 50 which supports the floor 42. A drainage hole is preferably provided in the cover plate 50 below the central portion of the housing 14 as indicated in dotted line at 52 in Fig. 4.

A modified embodiment of the device adapted for installation on gondola cars is shown in Figs. 2 and 3. This modified device is basically the same as that previously described for use with a flat car, differing principally in the proportions of the housing member and of the rotatable anchor element with respect to each other. The embodiment shown in Figs. 2 and 3 includes a rotatable anchor element 12', surrounded by a housing member 14'. Spaced bracket members 18' extend perpendicularly to the base portion 16' of the anchor element 12', the brackets 18' being connected together by a band-receiving link member 20'. Rib members 26' extend radially below the underneath surface of the base portion 16' and the upper surface of the base portion is provided with relieved portions 22', all as previously described. The housing member 14' includes an annular end portion 30' to which are connected web or leg portions 34'. The link member 20' and the bracket portions 18' of the rotatable element 12' project above the upper surface of the housing 14' at all times due to the fact that the longitudinal or axial dimension of the housing 14' is substantially less than the corresponding dimension of the housing 14 used in the flat car. The upper surface of the base 16' of the anchor element 12' lies slightly beneath the underneath surface of the annular end portion 30' of the housing 14' when the rotatable member 12' rests on the upper surface of the top chord 54 as shown in Fig. 3.

The anchoring device 10' is mounted on the top chord 54 of the gondola car 60 in the manner shown in Figs. 2 and 3. A plurality of the anchoring devices 10' are positioned in spaced relation longitudinally along each of the oppositely disposed top chords of the gondola car. The lower ends of the leg or web portions 34' of the housing 14' are rigidly attached as by welding to the upper surface of the top chord 54. A drainage slot is provided in the top chord 54 of the gondola car beneath the surface of the housing 14' as indicated in dotted outline at 52' in Fig. 3 of the drawings.

In using the anchoring device 10 on a flat car the rotatable element 12 is moved axially within the housing 14 from the recessed position shown in full line in Fig. 6 to the dotted outline position shown in Fig. 6 in which the link member 20 projects above the upper surface of the housing 14 and also above the upper surface of the floor 42. In this position of the anchor element, a lading band may be threaded around the link member 20. The rotatable element 12 may be rotated to any desired angular position about the vertical axis of the housing in order to adjust the position of the link 20 to conform with the angle of approach of the lading band as dictated by the location of the lading on the freight car.

In using the anchor device 10' on a gondola car, the anchor element 12' does not need to be raised from a recessed position as in the case of the anchoring element 12 since the anchor element 12' already projects above the surface of the housing 14'. The anchor element 12' may be rotated to any desired angular position to conform to the angular approach of the lading band.

Both the anchor devices 10 and 10' have a self-cleaning action due to the plowing action of the rib members 26 which project beneath the underneath surface of the base portion 16 of the rotatable anchor elements. As the rotatable anchor element 12 or 12' is rotated in its respective housing, the rib members 26 plow any debris which may have accumulated below the underneath surface of the rotatable member. The foreign matter moved by the plowing action of the ribs 26 is ejected through the openings 36 of the housing. In a similar manner, the recessed portions 22 in the upper surface of the base portion 16 provide a plowing action which ejects foreign matter accumulated between the anchor element 12 and the inner surface of the web portions 34 of the housing.

It can be seen from the foregoing that there is provided in accordance with this invention an improved lading band anchor which is angularly adjustable to conform to the requirements of the particular lading being anchored in the freight car. Furthermore, the lading anchor is so constructed as to provide a self-cleaning action which prevents clogging of the anchor housing which might otherwise prevent proper movement of the anchor.

While there have been shown and described particular embodiments of the invention, it will be obvious to those skilled in the art that various modifications and changes can be made therein without departing from the invention and, therefore, it is aimed to cover all such changes and modifications as fall in the true spirit and scope of the invention.

What I claim as my invention is:

1. In a lading anchor for a vehicular body or the like and attachable to a supporting surface of the body, a cylindrical housing member superimposed on said surface and adapted to be rigidly secured thereto, a disc-shaped anchor element loosely telescopically received within said housing to be confined between the housing and the support surface and to be free for rotational and axial displacement relative thereto, said housing having an upper annular end portion spaced from the supporting surface to limit the axial displacement of said anchor element and axially extending web portions limiting the lateral displacement of said anchor element, said web portions being spaced circumferentially about said annular end portion to define spaces between adjacent web portions, means carried by said anchor element and projecting from the upper surface thereof for receiving a lading band or strap, said band receiving means being extensible through said annular end portion of said housing axially beyond said housing, integral radially extending dependent ribs on said anchor element for ejecting from said housing foreign matter interposed between said anchor element and said supporting surface, said foreign matter being ejected between said spaces between said adjacent web portions of said housing upon free rotational movement of said element within said housing.

2. In a lading anchor adapted for attachment to a support surface or the like, a housing member adapted to be secured to said supporting surface and having an upper annular end portion attachable to the support surface through depending circumferentially spaced web portions, a disc-shaped anchor element entrapped between said housing member and said supporting surface for free rotational and axial movement relative thereto, means carried by said anchor element and projecting from the upper surface thereof for receiving a lading band or strap, said band receiving means extending through said annular end portion of the housing and axially beyond said housing when said anchor is in use, said anchor element being rotationally movable within said housing through 360 degrees of rotation about the longitudinal axis of the housing, and depending rib means carried by the anchor element on the under-surface thereof for ejecting foreign matter radially from the housing and through said spaces between adjacent web portions of the housing upon such rotational movement of said element.

References Cited in the file of this patent

UNITED STATES PATENTS

| | | |
|---|---|---|
| 1,416,191 | Girard | May 16, 1922 |
| 1,699,290 | Goodspeed | Jan. 15, 1929 |
| 1,846,750 | Patterson | Feb. 23, 1932 |
| 2,069,644 | Butterworth | Feb. 2, 1937 |
| 2,073,349 | Nampa | Mar. 9, 1937 |
| 2,078,052 | Butterworth | Apr. 20, 1937 |
| 2,094,407 | Nampa | Sept. 28, 1937 |
| 2,312,119 | Nystrom et al. | Feb. 23, 1943 |
| 2,449,049 | Black | Sept. 14, 1948 |
| 2,596,855 | Johnson | May 13, 1952 |
| 2,613,614 | Goodwin | Oct. 14, 1952 |